US006513026B1

(12) United States Patent
Horvitz et al.

(10) Patent No.: US 6,513,026 B1
(45) Date of Patent: Jan. 28, 2003

(54) DECISION THEORETIC PRINCIPLES AND POLICIES FOR NOTIFICATION

(75) Inventors: Eric J. Horvitz, Kirkland, WA (US); David O. Hovel, Bellevue, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 09/596,348

(22) Filed: Jun. 17, 2000

Related U.S. Application Data
(60) Provisional application No. 60/189,801, filed on Jul. 16, 2000.

(51) Int. Cl.$^7$ .............................................. G06F 17/00
(52) U.S. Cl. .............................. 706/46; 707/6; 707/102
(58) Field of Search ....................... 707/6, 102; 706/11, 706/12, 46

(56) References Cited

U.S. PATENT DOCUMENTS

| 5,864,848 A | 1/1999 | Horvitz |
| 6,021,403 A | 1/2000 | Horvitz |
| 6,421,655 B1 * | 7/2002 | Horvitz et al. ................. 706/61 |

OTHER PUBLICATIONS

U.S. application Ser. No. 09/007,894, Horvitz, A Technique for Prefetching, filed Jan. 15, 1998.
U.S. application Ser. No. 09/055,477, Methods and Apparatus for . . . , filed Apr. 6, 1998.
U.S. application Ser. No. 09/364,522, Horvitz, Methods for Display . . . , filed Jul. 30, 1999.
U.S. application Ser. No. 09/364,528, Horvitz, Methods for Routing . . . , filed Jul. 30, 1999.
U.S. application Ser. No. 09/365,293, Horvitz, Integration . . . , filed Jul. 30, 1999.
U.S. application Ser. No. 09/365,287, Horvita, A Computational . . . , filed Jul. 30, 1999.
U.S. application Ser. No. 09/364,527, Horvitz, Method for Automatically . . . , filed Jul. 30, 1999.
M. Sahami et al, (1998), A Bayesian approach to filtering junk email, in Workshop on learning for text categorizations, AAAI Technical Report WS–98–05, AAAI.
D. Koller et al, (1996) Toward optimal feature selection, in proceedings of 13$^{th}$ conference on machine learning, pp. 284–292, Morgan Kaufmann, San Francisco.
E. Horvitz et al, (1998) The Lumiere project, Bayesian user modeling for inferring the goals and needs of software users, in proceedings of the 14$^{th}$ conf on uncertainty in AI, pp. 256–265, Morgan Kaufmann, San Francisco.
J. Platt (1999), Probabilistic outputs for support vector machines and comparisons to regularized likelihood methods, in Advances in Large Margin Classifiers, MIT Press, Cambridge, MA.
H. Leiberman (1995), Letizia, An agent that assists web browsing, in proceedings of IJCAI–95, Montreal Canada, Morgan Kaufmann, San Francisco.

(List continued on next page.)

Primary Examiner—Wilbert L. Starks, Jr.
Assistant Examiner—Joseph P. Hirl
(74) Attorney, Agent, or Firm—Amin & Turocy, LLP

(57) ABSTRACT

Performance of a decision-theoretic analysis to determine which notifications as can be received from notification sources should be conveyed to the user, and via which modes of which notification sinks, is disclosed. A value can be determined for each mode of each notification sink, equal to an expected value of information contained within the notification, minus an expected cost of disruption to convey the notification via each mode of each sink, minus an expected value of the user independently learning the information contained with the notification without notification, and minus an actual cost of conveying the notification via each mode of each sink. If this value is greater than a predetermined conveyance threshold for any mode of any sink, then the notification is conveyed via the mode of the sink having the highest such value.

33 Claims, 3 Drawing Sheets

OTHER PUBLICATIONS

Horvitz et al, (1995) Display of information for time–critical decision making, in proceedings of the 11$^{th}$ conf on uncertainty in Al, pp. 296–305, Monetrea, Canada.

M. Czerwinski et al (1999), Visualizing implicit queries for information management and retrieval, in proceedings of CHI'99, ACM SIGCHI Conf on informational and knowledge management, pp. 560–567, ACM.

S. Dumais et al (1998), Inductive learning algorithms and representations for text categorization, in Proceedings of 7$^{th}$ Intl Conf on Information and Knowledge Management, pp. 148–155, ACM.

Platt (1999), Fast training of support vector machines using sequential minimal optimization, in advances in kernel methods, support vector learning, MIT Press, Cambridge, MA.

Horvitz (1999), Principles of mixed–initiative user interfaces, in Proceedings of CHI'99, ACM SIGCHI Conf on Human Factors in Computing Systems, Pittsburgh, PA, 159–166, ACM.

Breese et al (1998) Empirical analysis of predictive algorithms for collaborative filtering, in Proceedings of the 14$^{th}$ conf on uncertainty in Al, pp. 43–52, AUAI, Morgan Kaufmann, San Francisco.

Horvitz, Rutledge (1991), Time dependent utility and action under uncertainty, in proceedings of 7$^{th}$ conf on uncertainty in Al, LA, CA, pp. 151–158, Morgan Kaufmann, San Francisco.

Horvitz, Seiver (1977), Time–critical action: representations and application, in proceedings of the 13$^{th}$ conf on uncertainty in Al (UAI–97), pp. 250–257, Providence, RI, Morgan Kaufmann, San Francisco.

* cited by examiner

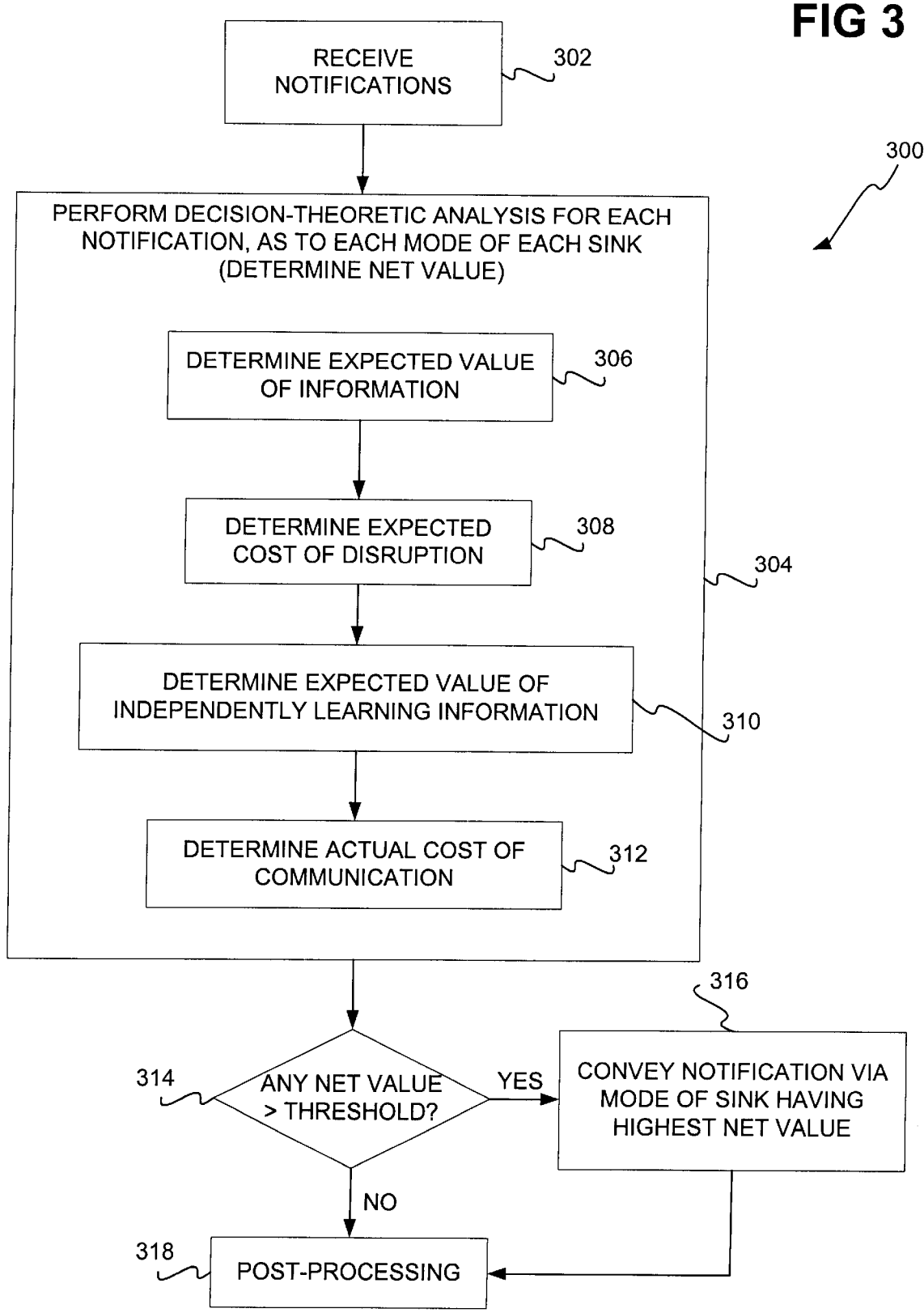

DECISION THEORETIC PRINCIPLES AND POLICIES FOR NOTIFICATION

RELATED APPLICATIONS

The present application claims the benefit of the provisional patent application filed on Jul. 16, 2000, entitled "Attentional Systems and Interfaces," and assigned Ser. No. 60/189,801.

FIELD OF THE INVENTION

This invention relates generally to unified receipt and notification of alerts generated by varied devices and applications for conveyance to a user, and more particularly to performing decision-theoretic notification for utilization with such unified alert receipt and notification.

BACKGROUND OF THE INVENTION

Many computer users today receive information from a number of different sources, and utilize a number of different devices in order to access this information. For example, a user may receive e-mail and instant messages over a computer, pages over a pager, voice-mail over a phone, such as a cellular ("cell") or landline phone, news information over the computer, etc. This makes it difficult for the user to receive all his or her different information, referred to also as alerts or notifications, wherever the user happens to be.

For example, a user may be away from his or her computer, but receive an important e-mail. The user may have access only to a cell phone or a pager, however. As another example, the user may be working on the computer, and have turned off the ringer and voice-mail indicator on the phone. When an important voice-mail is left, the user has no way of receiving this information on the computer.

Moreover, many of the alerts may not be important to the user—for example, an e-mail from the user's manager or co-worker should often receive higher priority than the latest sports scores. More generally, the value of the information contained in an alert should be balanced with the costs associated with the disruption of the user by an alert. Both the costs and value may be context sensitive. Beyond notifications about communications, users are alerted with increasing numbers of services, error messages, and computerized offers for assistance, generated by systems and applications running on the local computer or on external computer and communication systems.

SUMMARY OF THE INVENTION

This invention relates to performing a decision-theoretic analysis to determine which notifications as can be received from notification sources should be conveyed to the user, and via which modes of which notification sinks. In one embodiment, a value is determined for each mode of each notification sink, equal to an expected value of information contained within the notification, minus an expected cost of disruption to convey the notification via each mode of each sink, minus an expected value of the user independently learning the information contained with the notification without notification, and minus an actual cost of conveying the notification via each mode of each sink. If this value is greater than a predetermined conveyance threshold for any mode of any sink, then the notification is conveyed via the mode of the sink having the highest such value. The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

Example Computerized Device

Figure 1:
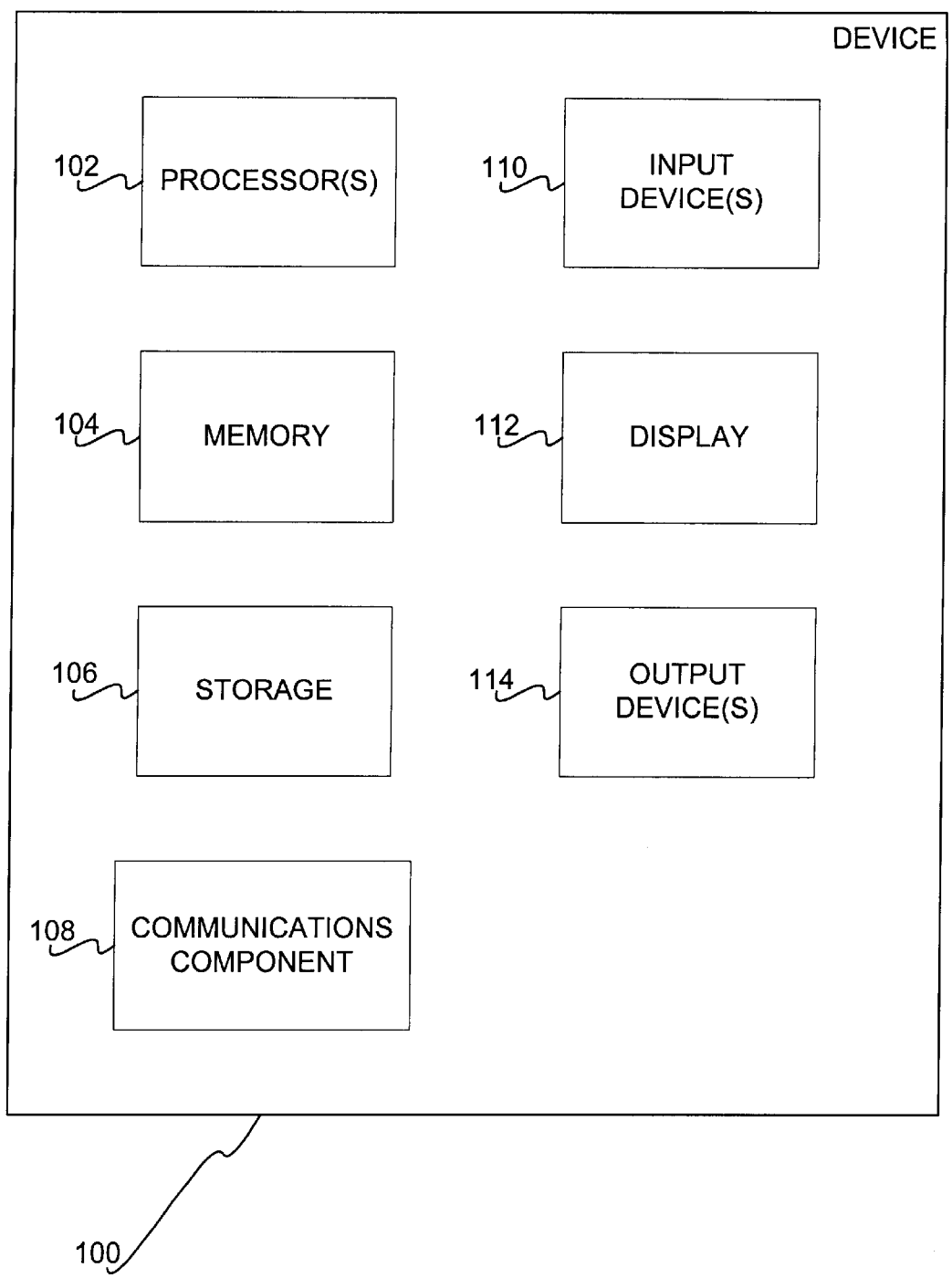
FIG. 1 is a diagram of an example computerized device in conjunction with which embodiments of the invention can be practiced.

Referring to FIG. 1, a diagram of an example computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) and/or random access memory (RAM). The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules, and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated services Digital Network (ISDN) adapter, etc.; the invention is not so limited. Furthermore, the input device(s) 110 are the mechanisms by which a user indicates input to the device 100. Such device(s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Example Architecture

Figure 2:
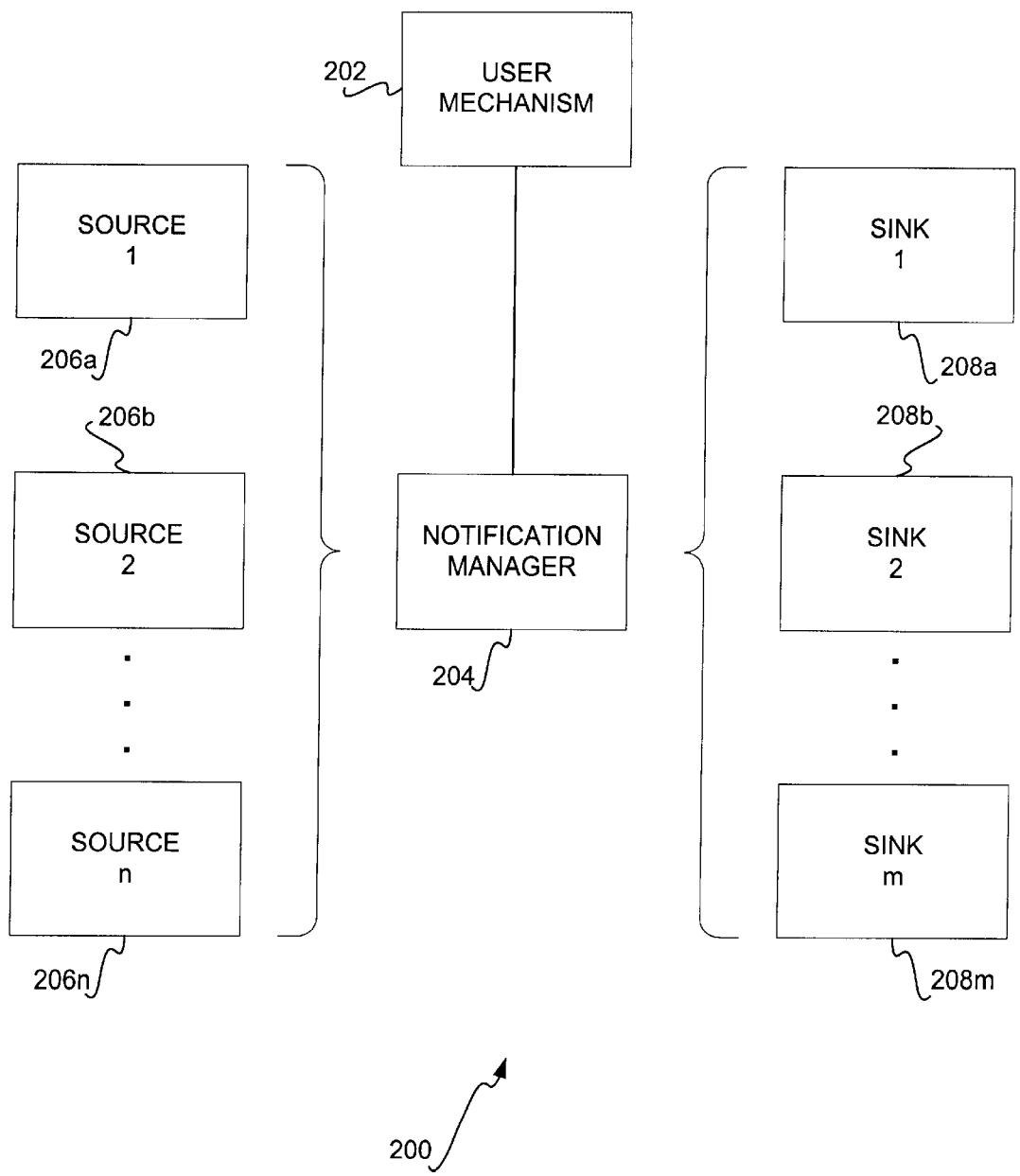
FIG. 2 is a diagram of a notification architecture in conjunction with which embodiments of the invention can be practiced; and, FIG. 3 is a flowchart of a method according to an embodiment of the invention.

In this section of the detailed description, an example notification architecture in conjunction with which embodiments of the invention may be used is described, in conjunction with the diagram of FIG. 2. The architecture 200 of FIG. 2 includes a user mechanism 202, a notification manager 204, a number of notification sources 206a, 206b, . . . , 206n, and a number of notification sinks 208a, 208b, . . . , 208m, and where there can be any number of sinks and sources. In general, the notification manager 204 conveys notifications from the sources 206 to the sinks 208, based on information stored in the user mechanism 202. Each of the components of the architecture 200 of FIG. 2 is now described in turn.

The user mechanism 202 stores information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have in different locations. Such parameters may also be functions of observations made autonomously via one or more sensors. For example, profiles may be selected or modified based on information about a user's location as might be provided by a Global Positioning System (GPS) subsystem, on information about the type of device being used and/or the pattern of usage of the device, the last time a device of a particular type was accessed by the user, etc. Beyond relying on sets of predefined profiles or dynamic inference, the notification architecture can also allow users to specify in real-time his or her state, such as the user not being available except for important notifications for the next x hours, or until a given time.

Parameters can include default notification preference parameters regarding a user's preference as to being disturbed by notifications of different kinds in different settings, which can be used as the basis from which to make notification decisions by the notification manager 204, and the basis upon which a particular user can make changes. The parameters may include default parameters as to how the user wishes to be notified in different situations, such as by cell phone, by pager, etc. The parameters can include such assessments as the costs of disruption associated with being alerted by different modes in different settings. That is, the parameters can include contextual parameters indicating the likelihoods that the user is in different locations, the likelihoods that different devices are available, and the likelihoods of his or her attentional status at a given time, as well as notification parameters indicating how the user desires to be notified at a given time.

The information stored by the user mechanism 202 can be inclusive of contextual information determined by the mechanism 202. The contextual information is determined by the mechanism 202 by discerning the user's location and attentional status based on one or more contextual information sources. The mechanism 202, for example, may be able to determine with precision the actual location of the user via a global-positioning system (GPS) that is a part of a user's car, cell phone, etc. The mechanism 202 may also use a statistical model to determine the likelihood that the user is in a given state of attention (e.g., open to receiving notification, busy and not open to receiving notification, etc.) by considering background assessments and/or observations gathered through considering such information as the type of day (e.g., weekday, weekend, holiday), the time of day, the data in the user's calendar, and observations about the user's activity.

Each of the sources 206a, 206b, . . . , 206n is able to generate notifications intended for the user. For example, the sources 206 may include communications, such as Internet and network-based communications, local desktop computer-based communications, and telephony communications, as well as software services, such as intelligent help, background queries, automated scheduling, etc.

For example, e-mail may be generated as notifications by an e-mail notification source such that they are prioritized, where the host application program generating the notifications assigns the e-mail with relative priorities corresponding to the likely importance or urgency of the e-mail to the user. The e-mail may also be sent without regard to their relative importance to the user. Desktop-centric notifications can include an automated dialog with the goal of alerting a user to a potentially valuable service that he or she may wish to execute (e.g., scheduling from a message), information that the user may wish to review (e.g., derived from a background query), or errors and other alerts generated by a desktop computer. Internet-related services can include notifications including information that the user has subscribed to, such as headlines of current news every so often, stock quotes, etc.

Other notifications can include background queries (e.g., while the user is working, text that the user is currently working on may be reviewed such that background queries regarding the text are formulated and issued to search engines), scheduling tasks from a scheduling or other program, etc. Notification sources 206 can themselves be push-type or pull-type sources. Push-type sources are those that automatically generate and send information without a corresponding request, such as headline news and other Internet-related services that send information automatically once subscribed to. Pull-type sources are those that send information in response to a request, such as e-mail being received after a mail server is polled.

Each of the notification sinks 208a, 208b, . . . , 208m is able to provide the notifications to the user. For example, such notification sinks 208 can include computers, such as desktop and/or laptop computers, handheld computers, cell phones, landline phones, pagers, automotive-based computers, etc. It is noted that some of the sinks 208 can convey notifications more richly than other of the sinks 208. For example, a desktop computer typically has speakers and a relatively large color display attached to it, as well as having a high bandwidth for receiving information when attached to a local network or to the Internet. Therefore, notifications can be conveyed by the desktop computer to the user in a relatively rich manner. Conversely, most cell phones have a small display that is black and white, and receive information at relatively low bandwidth. Correspondingly, the information associated with notifications conveyed by the cell phone usually must be shorter and geared towards the phone's known limitations. Thus, the content of a notification may differ depending on whether it is to be sent to a cell phone or a desktop computer.

Each of the sinks 208 can have one or more different modes of signaling, also referred to simply as modes. The modes of signaling refer to the different ways in which a given device can alert the user about a notification. Devices (viz., sinks) may have one or more notification modes. For example, a cell phone can only vibrate, only ring with some volume, or it can both vibrate and ring. Furthermore, a desktop display for an alerting system can in one embodiment be decomposed into several discrete modes (e.g., a small notification window in the upper right hand of the display vs. a small thumbnail at the top of the screen—with or without an audio herald). Beyond being limited to a set of predefined behaviors, a device can allow for modes with alerting attributes that are functions of parameters, as part of its definition. Such continuous alerting parameters for a mode represent such controls as the volume at which an alert is played at the desktop, rings on a cell phone, the size of an alerting window, etc.

The notification manager 204 accesses the information stored by the user mechanism 202, and makes a decision as to which of the notifications it receives from the sources 206 to convey to which of the sinks 208 based on this information, including to which of the modes of which of the sinks 208. Furthermore, the manager 204 is able to determine how the notification is to be conveyed, depending on which of the sinks 208 it has selected to send the information to. For example, it may determine that the notification should be summarized before being provided to a given of the sinks 208. The manager 204 can be a computer program executed by a processor of a computer from a machine-readable medium such as a memory thereof.

The invention is not limited to how the manager 204 makes its decisions as to which of the notifications to convey to which of the notification sinks, and in what manner the notifications are conveyed. For example, a decision-theoretic analysis can be made, such that the notification manager is designed to infer important uncertainties about variables including a user's location, attention, device availability, and amount of time until the user will access the information if there were no alert, and make notification decisions about whether to alert a user to a notification, and if so, the nature of the summarization and the best device or devices to employ for relaying the notification. In general, the manager 204 determines the net expected value of a notification, considering the fidelity and transmission reliability of each available notification sink, as well as the attentional cost of disturbing the user, the novelty of the information to the user, the time until the user will review the information on his or her own, and the potentially context-sensitive value of the information and the increasing and/or decreasing value over time of the information contained within the notification.

The inferences made about uncertainties thus may be generated as expected likelihoods of values such as the cost of disruption to the user with the use of a particular mode of a particular device given some attentional state of the user, etc. The notification manager 204 makes decisions as to what the user is currently attending to and doing (based on, for example, contextual information), where the user currently is, how important the information is, what is the cost of deferring the notification, how distracting would a notification be, what is the likelihood of getting through to the user, what is the fidelity loss associated with a given notification sink, etc. Therefore, ultimately, the notification manager 204 performs an analysis, such as a decision-theoretic analysis, of pending and active notifications, evaluates context-dependent variables provided by information sinks and sources, and infers key uncertainties, such as the time until a user is likely to review provided information and the user's location and current attentional state.

Furthermore, the notification manager 204 can access information stored in a user profile by the user mechanism 202 in lieu of or to support a personalized decision-theoretic analysis. For example, the user profile may indicate that at a given time, the user prefers to be notified via a pager, and only if the notification has a predetermined importance level. Such information can be used as a baseline from which to start a decision-theoretic analysis, or can be the only manner by which the manager 204 determines how and whether to notify the user.

Decision-Theoretic Notification

In this section of the detailed description, decision-theoretic notification, as can be performed by the notification manager described in the previous section of the detailed description, is described. Notification is described via methods according to varying embodiments of the invention. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Referring to FIG. 3, a flowchart of a method 300 is shown. In 302, a number of notifications are received. Each notification has information that can be conveyed to a user, via a mode of a notification sink, as described in the previous section of the detailed description. In 304, a decision-theoretic analysis is performed for each notification, over a number of modes of a number of sinks. The analysis desirably results in a net value of conveying the notification via each mode of each sink. In one embodiment, analysis can be performed utilizing a probabilistic model, such as a Bayesian network. More specifically, analysis can be performed as is described in detail in the next section of the detailed description.

In one embodiment, determining the net value of conveying each notification for each mode of each sink in 304 involves performing 306, 308, 310, and 312 of FIG. 3. In 306, the expected value of the information contained within the notification to the user is determined. This is the value of the information that results to the user if he or she is notified. In 308, the expected cost of disruption of conveying the notification to the user, via each mode of each sink, is determined. This is the cost of disrupting the user to convey the notification—for example, the user may be busy in a meeting, such that disrupting the user with a notification results in a cost to the user. In 310, the expected value of the user independently learning the information contained in the notification, without actually being conveyed the notification, is determined. This value can be less than the value determined in 306, since the user may learn the information independently at a later time than if he or she would be notified to the information. In 308, the actual cost of communicating the notification to the user, via each mode of each sink, is determined. For example, sending a message via a pager may result in a communication charge being incurred by the user from the user's pager company, where such pages are charged by the company on a per-page basis.

The net value of conveying each notification to the user via each mode of each sink in one embodiment is determined in 304 by subtracting from the expected value of information determined in 306, the expected cost of disruption determined in 308, the expected value of the user independently learning the information in 310, and the actual cost of communication in 312. In 314, it is determined whether this net value for any mode of any sink is greater than a predetermined conveyance threshold. For example, where the net value is measured in dollars ($), the predetermined conveyance threshold may be zero. If the net value of any notification is greater than the threshold for any mode of any sink, then the method proceeds to 316 for such notifications, where each such notification is conveyed to the user via the mode of the sink having the highest net value for the notification. Otherwise, for those notifications not having net values greater than the threshold for any mode of any sink, the user is not currently notified of the information contained in such notifications, and the method 300 proceeds directly to 318 for such notifications, to perform post-processing, to which the method also proceeds from 316 as well.

The invention is not limited by the manner by which post-processing is performed in 318. In one embodiment, any notification that was conveyed in 316 to the user, assuming that 316 were performed, is deleted. In another embodiment, such notifications are deleted upon receiving confirmation that the user has in fact received the notification, from the notification sink to which each notification was conveyed. The notifications can also be deleted after conveyance only if it has been determined that the notification sink to which each notification was conveyed has a transmission reliability for the mode of the sink utilized greater than some threshold. Furthermore, it is noted that the method 300 of FIG. 3 can be repeated at predetermined intervals, and/or as new notifications are received. For example, inasmuch as the net value of a notification as determined in 304 is time-dependent, a given notification that may have a net value less than the conveyance threshold now may have a net value greater than the threshold later, such that it is then conveyed. The reverse situation can also be true. Thus, the method 300 of FIG. 3 shows the manner by which decision-theoretic analysis is performed to determine whether each notification should be conveyed to the user via a mode of a sink, such that the analysis can be reperformed as desired, and is not limited by the invention.

It is noted that the method 300 of FIG. 3 has been described as to the performance of a decision-theoretic analysis for a notification over a number of modes of a number of notification sinks. However, the invention itself is not so limited. For example, there may implicitly be only one such mode for any or all of the sinks. In this case, the analysis for a notification is performed over the sinks, without explicit regard to the mode. Furthermore, as has been noted, in one embodiment, the determination of the net value of each notification as to each mode of each sink is performed as is specifically described in the next section of the detailed description.

Specific Embodiment of Decision-Theoretic Notification

In one embodiment, decision-theoretic notification as described in the previous section of the detailed description can be performed as is specifically detailed in this section of the detailed description, although the invention is not so limited. An iterative greedy analysis is employed. During each part of the analysis, the current context and associated expected value of transmitting the alert now are considered. Less approximate, more precise decision-theoretic analyses that perform inferences about the future, that consider a range of future times, contexts, and associated expected values using such methods as dynamic Bayesian networks, or approximations of dynamic Bayesian networks referred to as Hidden Markov models (HMM's) are known in the art. Such techniques can be employed to make notification decisions based on such less myopic analyses that "forecast" the context at future states. Within the art, generalizing myopic analyses to richer, less myopic analyses is known. For a notification platform, these "less greedy" analyses require additional quantities of computation. A notification manager in one embodiment is built that can shift into less myopic modes based on a consideration of the computation that is now available, or that will be available, per monitoring the status of available computational resources. That is, the invention is not limited to the greedy approach described. Less approximate, less greedy optimizations of ideal time and device for notifications can consider a range of future contexts and associated availabilities of devices, by forecasting the likelihoods of these contexts and device availabilities.

The expected value of a notification N at time t is the current value of the notification. The informational value of a notification is considered as being sensitive to the context and to the knowledge of the user. The context includes such contextual information as the location and attentional status of the user, the goals of the user, and the context—e.g., did the user just open email, etc. The initial value of a notification N in a context C is the value (as, for example, can be measured in dollars) of the notification in the context when the notification is first generated by a source, diminished by the probability that the user is not already familiar with the information. The probability that the user is not familiar with the information is referred to as the novelty of the information. This probability is based on such evidence E as the type of information and the way the information is distributed (e.g., a news story becomes known via other channels over time and thus the evidence can include the salience and the age of a news story).

If the value of information when it is already known to be zero is considered, the value of a notification is:

$$\text{ValInfo}(N_i) = p(\text{novel}|E) \times \text{value}(N_i, t_0) \qquad (1)$$

The notion of context-specificity can be introduced by conditioning the value on a context C, and assessing the value based on a context:

$$\text{ValInfo}(N_i) = p(\text{novel}|E) \times \text{value}(N_i, C_j, t_0) \qquad (2)$$

At some new time t, the value of transmitting the notification may change based on the time-dependency of the value:

$$\text{ValInfo}(N_i) = p(\text{novel}|E) \times \text{value}(N_i, C_j, t) \qquad (3)$$

The value function can be represented by time-dependent functions that take as arguments the difference of time or delay between the time an alert is sent or received by the notification manager, and the current time, where delay is just $t-t_0$. Such functions may include, for example, linear, exponential, and sigmoidal functions that indicate the loss of value delay. More complex functions include concatenations of linear, exponential, and sigmoidal functions, such as functions that represent a "shelf life" which refers to the period of time following the time an alert is sent or received where the value does not change, before the value of the information begins to change, e.g., begins to decay. Other functions can capture the notion that an alert can become more valuable with some amount of delay. In one embodiment, the fact that the context can also change and be different at the new time is considered. Thus, equation (3) can be rewritten with C(t), or the context can be stated as always being the current context. Under uncertainty in the context, the different potential contexts are summed over. Thus, the expected value of the information is:

$$\text{ExpValInfo}(N_i) = p(\text{novel}|E) \Sigma_j \text{value}(N_i, C_j, t) p(C_j|E) \qquad (4)$$

This is the value of the user receiving the full content of the notification at some time t in context C.

The expected value of communicating the information with mode M of a device is diminished by the loss of fidelity associated with the rendering and consideration of whether the information has been transmitted to the user when signaled with the mode M in context C. It can be assumed for sake of simplicity that the fidelity of the transmission is captured as a variable ranging between zero, for no transmission of the content, to one, for the full transmission of the content. In other embodiments, more detailed utility models are considered that capture additional details of the losses of dropping different components of the initial content, and the truncation and summarization of the content in different ways (e.g., the truncation by some total percentage of the full text of an email message—or some other, more intelligent approach to summarization—into a smaller, more compact message for display on a limited cell phone display). In the general case, the fidelity associated with the transmission of the information over mode M of a device is dependent on the context; for example, it may be hard to hear the audio portion of audio content in a noisy environment.

The probability that the information has been transmitted to the user may also be considered. This, in the general case, is also dependent on the context. As this dependency is typically more salient than the context-dependency of the fidelity, this can be specified explicitly. Transmission of the information as a probability that the user has received the information is represented as p(received|M,C,E,e), where e represents additional evidence about a user's response to a notification, such as a pause, mouse over, interaction, etc.; the invention is not so limited.

Next, the expected value of communication of the notification is determined as $$\text{ExpValCom}(N_i, M_k) = p(\text{novel}|E) \text{fidelity}(M_k) \Sigma_j \text{value}(N_i, C_j, t) p(\text{received}|M_k, C_j, E, e) p(C_j|E) \qquad (5)$$

Note that the expected value of the communication in equation (5) is written in terms of the expected value of the information of the notification. This is the same as $$\text{ExpValCom}(N_i, M_k) = \text{ExpValInfo}(N_i) \text{fidelity}(M_k) \Sigma_j p(\text{received}|M_k, C_j, E, e) p(C_j|E) \qquad (6)$$

The expected value of communication as embodied in equations (5) and (6) can in one embodiment be used as the expected value of the information to the user as described in the previous section of the detailed description. Alternatively, the expected value of information used in the previous section of the detailed description can be the expected value without consideration of the fidelity and other parameters—that is, as just $\text{ExpValInfo}(N_i)$. The invention is not particularly limited to either approach.

Next, cost of the information is considered. The cost of associated with the disruption depends on the mode of the transmission and the context, mostly via the attentional context of the user. The expected cost of disruption of the user for each context is also measured in dollars in one embodiment, equal to the amount a user would be willing to pay to avoid the disruption associated with the transmission of the information via mode M. In the general case, this can also be dependent on the details of the context being transmitted In one embodiment, however, the different costs under the uncertainty of the context are specifically considered. Thus, an expected cost of disruption for each mode M is $$\text{ExpCostDisrupt}(M_k) = \Sigma_j \text{CostDisrupt}(M_k, C_j) p(C_j|E) \qquad (7)$$

The value of signaling a user now with a notification via mode M is the difference between the value and the cost of the information. The dollar cost of the actual communication, i.e., the cost of transmitting the bits, per the fees charged by a service, is also considered in one embodiment. This is a function of the notification content and the mode selected. This is referred to as the (actual) communication cost, ComCost(N, M).

Next, it must be considered that the (net) value is not zero if the user is not actively signaled with a notification, but that the user may receive the information later when he or she is free to review the information or actively seek the information from a store, such as an e-mail store, or for general purposes, a store of potential notifications that is maintained until the user has an opportunity to review them. This is referred to as the expected value of seeking the information contained within the notification, ExpValSeek, referred to in the previous section of the detailed description as the expected value of the user independently learning the information without notification. The value is determined by considering the time until a user will review the information contained in the notification. This time is typically context sensitive, as, for example, the time until a user seeks information from such a store can depend on the location, time of day, and the current focus of attention, etc. It is considered that the novelty of the information may change and may be a function of the amount of time that the notification has been pending. For simplification, the fidelity can be considered full when the user seeks the information—however, in the general case, the user may be seeking the information through a device that provides lower fidelity. It is also assumed that the cost of disruption associated with seeking the information is zero, as the user will be in an attentional state to actively pursue the information.

Thus, $$\text{ExpValSeekInfo} = \Sigma_{tseek} p(t_{seek}|E) p(\text{Novel}, t_{seek}|E) \Sigma_j \text{Value}(N_i, C_j, t_{seek}) p(C_j|E, t_{seek}) \quad (8)$$

It is noted that there are several approaches for implementing and determining equation (8) with respect to determining the latency between the time of a notification and the time until seek. In one embodiment, it is assumed that t is distributed with a Poisson distribution and that the time of seeking is the (memoryless) mean time until a user reviews the notification store from the time of the analysis. The latency is determined as the difference between that time and the time of the notification. Furthermore, a Bayesian network or other probabilistic model can be used to infer a probability distribution over the different mean times to review an email, or a more general notification store, etc. A Bayesian network or other probabilistic model can also be used to determine the probability distributions over the user's attentional focus, location, etc.

Thus, the net expected value of the communication of the notification, NetExpValCom for communicating notification N with mode M is:

$$\text{NetExpValCom}(N_i, M_k) = \text{ExpValCom}(N_i, M_k) - \text{ExpCostDisrupt}(M_k) - \text{ExpValSeekInfo}(N_i) - \text{ComCost}(N_i, M_k) \quad (9)$$

This is what has been referred to as the net value in the previous section of the detailed description.

For decision-making, for each notification coming in the NetExpValCom for all modes M of all devices are considered. The device that has the largest positive NetExpValCom is considered (that is, assuming a predetermined conveyance threshold of zero dollars, as this term is used in the previous section of the detailed description). If the NetExpValCom is positive for more than one device (i.e., notification sink), the device with the highest value is selected and signal the user with that device. If the value is negative for all modes of all devices, notification is deferred, and may be journaled for later review in some embodiments. The value of rendering the notification continues to be reconsidered in one embodiment, but by updating variables that change with time. These include the current time, the expected time until the user reviews his or her email, or, more generally, his or her notification store, and such variables as current context and novelty of the information. Such reconsideration can be performed as part of the post-processing as has been described in the previous section of the detailed description.

It is noted that this iterative reasoning about now versus later is the type of decision-theoretic analysis that is performed in a particular embodiment of the invention. It is a greedy decision making-strategy. However, less greedy strategies can be formulated that rely on more complex forecasting models that consider the values and costs of an active notification at future times. For example, a probabilistic model can be employed to forecast future attentional states of the user and such forecasts can be used in reasoning in an increasingly less greedy of a manner.

Furthermore, even after signaling a single time, in some embodiments the notification is not immediately discarded (viz., deleted). For example, it cannot be typically assured that the notification has gotten through to the user, once it is rendered. Such assurance is possible, however, if the system has a mechanism in place such as a shared understanding between user and system that, for example, the user causing a cursor to hover over the rendered notification in a desktop scenario is the manner by which for the user to indicate to the system, "yes, I got this," or by automatically monitoring the access of the notification in some other way. An example of the latter is monitoring whether a user has examined the message on his or her cell phone. The reporting of such monitoring can be the confirmation of notification receipt as noted in the previous section of the detailed description.

Each mode of each sink is considered as having a context-sensitive transmission reliability, which is also referred to as the transrel of the mode in that context, transrel(M, C). That is, for each mode, and for each context, the transmission reliability gives the probability that a user has seen the notification based on that one rendering. As has been noted, at times, confirmation that transrel has been 1.0 can be received—for example, with an interaction with a notification or with a mouse over of a notification, such that a user has definitely seen the notification with probability 1.0. At other times, the transmission reliability for the mode and the context can be relied upon.

The likelihood that the user has received the information p(receive) for each notification is updated after each transmission. $H^A (N_i)$ is used to refer to the alerting history of a specific notification that has been pending in a general, internal in-box. The alerting history indicates the sequence of attempted notifications, where $$H^A(N_i): \{A_1(N_i, M, C), A_2(N_i, M, C), A_3(N_i, M, C), \ldots A_n(N_i, M, C)\} \quad (10)$$

$A(N_i, M)$ refers to an alert about notification $N_i$ with mode M. Given a notification history, the current notification novelty, $p(\text{notification unseen}|H^A, E, e)$, can be determined. Including this factor appropriately diminishes the expected value of seeing the notification.

More specifically, first, an updated ExpValCom and ExpValSeek are $$\text{ExpValCom}(N_i, M_k) = p(\text{novel}|E) \text{fidelity}(M_k) \times p(\text{notification unseen}|H^A, E) \times \Sigma_j \text{value}(N_i, C_j, t) p(\text{received}|M_k, C_j, E, e) p(C_j|E) \quad (11)$$

$$\text{ExpValSeekInfo} = p(\text{notification unseen}|H^A, E, e) \times \Sigma_{tseek} p(tseek|E) p) \text{Novel}, tseek |E) \times \Sigma_j \text{Value}(N_i, C_j, t) p(C_j|E, tseek) \quad (12)$$

Next, NetExpValCom is determined in the same way as before, but with these new ExpValCom and ExpValSeekInfo values. Thus, $$\text{NetExpValCom}(N_i, M_k) = \text{ExpValCom}(N_i, M_k) - \text{ExpCostDisrupt}(M_k) - \text{ExpValSeekInfo}(N_i) - \text{ComCost}(N_i, M_k) \quad (13)$$

Finally, the notification novelty, $p(\text{notification unseen}|H^A, E, e)$, must be updated. In one embodiment, this is determined after each new attempt at an alert (each notification rendering, or conveyance of a notification) is made, by considering each attempt as a Bernoulli trial as is now described. Given an alerting history, $H^A(N_i)$: $\{A_1(N_i, M, C(t_1)), A_2(N_i, M, C(t_2)), A_3(N_i, M, C(t_3)), \ldots A_n(N_i, M, C(t_n))\}$, the notification novelty is $$p(\text{notification unseen}|H^A, E, e) = [1-p(\text{received } A_1|M, C(t_1), E, e_1)] \times [1-p(\text{received } A_2|M, C(t_2), E, e_2)] \times \ldots \times [1-p(\text{received } A_n|M, C(t_n), E, e_n)] \quad (14)$$

It is also noted that notifications can be chunked—that is, grouped together for transmission as a single grouping of notifications via a given mode of a given notification sink—by considering notification sets that include a set of simultaneous notifications.

$$\text{NetExpValCom}(N_i, M_k) = [\Sigma_{i=1 \ldots n} \text{ExpValCom}(N_i, M_k) - \text{ExpValSeekInfo}(N_i) - \text{ComCost}(N_i, M_k)] - \text{ExpCostDisrupt}(M_k) \quad (15)$$

Thus, a summation of the value and costs of each notification is considered, where only the penalty of one disruption is contemplated.

Other Extensions

In this section of the detailed description, various extensions to the embodiments of the invention described in the preceding section of the detailed description are presented. First, it is noted that decision-theoretic policies may be compiled and/or approximated into simpler rules and polices in one embodiment. This can utilize formal methods for compiling such decision-theoretic analyses into polices, as known within the art. Furthermore, there are a variety of simpler, heuristic polices that may be created in the spirit of these polices, but that perform a coarser cost-benefit analysis.

Furthermore, in one embodiment, the use of the decision-theoretic policies is for situations of "pulling information." That is, when a user requests information from the system, including requests during desktop as well as in mobile situations, the cost of distraction to be zero is considered, and information can be related about the next most valuable notification to send to the user. Such information can be ordered by next most valuable, or can be grouped for cognitive purposes into categories. In one embodiment, the next n most valuable notifications is examined, such that a command is related to stream the notifications in this order, or to wait for each request for "next notification" in order of expected utility.

In another embodiment, information is related in terms of categories of sources, based, for example, in the order of the source containing a notification with the highest expected utility. Relaying notifications can continue within the source category until reaching some threshold of expected value before moving onto the source containing a notification with the next highest value, and the process is then repeated. Alternatively, information can be relayed by a predefined sequencing of sources (e.g., voicemail messages first, followed by instant messages, followed by email, and then by financial notifications, etc.), and then relaying notifications from each of the sources, sorted by expected utility within the category, until reaching a threshold in expected utility for that category and then moving on.

The expected value of information can be used in another embodiment to tailor high-level summaries of the current situation. For example, there can be reasoning across sources to build a text-to-speech summary of pending notifications for use for communication of the current notification situation over cell phones. The expected value determinations can also be used to inform speech recognition systems to listen better, by assuming user's will be most interested in the highest expected value items, to, for example, enhance dialog in mobile and desktop settings.

Finally, another extension to the embodiments of the invention that have already been described is that the set of expected values within each source category can be used to tailor summaries. Such summaries might appear in a persistent summary for relaying overviews of the status of notifications for each source. For example, an email summary could be like the following: "32 unread messages; 9 of high urgency; most urgent from Andyj on 'Meeting this afternoon.'"

Conclusion

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, while several manners by which user context can be determined have been described separately, they can be used in any combination with one another, or other context determination manners, too. Therefore, it is manifestly intended that this invention be limited only by the claims and equivalents thereof.

We claim:

1. A computer implemented method comprising:
   for each of a number of notifications, performing a decision-theoretic analysis as to the notification over a number of notification sinks; and,
   conveying at least one of the number of notifications to at least one of the number of notification sinks based on the decision-theoretic analyses performed.

2. The method of claim 1, wherein performing the decision-theoretic analysis as to the notification compromises the performing the decision-theoretic analysis over each of a number of modes of each notification sink.

3. The method of claim 1, wherein performing the decision-theoretic analysis as to the notification over the number of notification sinks results in a value for the notification as to each notification sink.

4. The method of claim 3, wherein conveying the at least one of the number of notifications to the at least one of the number of notification sinks comprises conveying each notification having a value for any of the notification sinks greater than a predetermined conveyance threshold to the notification sink for which the notification has a highest value.

5. The method of claim 1, wherein performing the decision-theoretic analysis as to the notification comprises performing the decision-theoretic analysis over each of a number of modes of each notification sink, which results in a value for the notification as to each mode of each notification sink.

6. The method of claim 5, wherein conveying the at least one of the number of notifications to the at least one of the number of notification sinks comprises conveying each notification having a value for any of the mode of any of the notification sink for which the notification has a highest value.

7. The method of claim 1, wherein performing the decision-theoretic analysis comprises utilizing a probabilistic model.

8. The method of claim 7, wherein utilizing the probabilistic model comprises utilizing a Bayesian network.

9. The method of claim 1, further comprising deleting each of the notifications that has been conveyed.

10. The method of claim 1, further comprising, for each of the notifications that has been conveyed to a notification sink, deleting the notification upon receiving confirmation of receipt from the notification sink.

11. The method of claim 1, further comprising, for each of the notifications that has been conveyed to a notification sink, deleting the notification in response to determining that the notification sink has a transmission reliability greater than a predetermined threshold.

12. The method of claim 1, wherein performing the decision-theoretic analysis further comprises determining an expected value of information contained within the notification.

13. The method of claim 12, wherein performing the decision-theoretic analysis further comprises determining an expected cost of disruption of conveying the notification as to each notification sink.

14. The method of claim 13, wherein determining the expected cost of disruption of conveying the notification for each notification sink comprises determining the expected cost of disruption of conveying the notification as to each of a number of modes of each notification sink.

15. The method of claim 13, wherein performing the decision-theoretic analysis further comprises determining an expected value of a user independently learning the information contained within the notification without having the notification conveyed to the user.

16. The method of claim 13, wherein performing the decision-theoretic analysis further comprises determining an actual cost of conveying the notification to each notification sink.

17. The method of claim 16, wherein determining the actual cost of conveying the notification to each notification sink comprises determining the actual cost of conveying the notification for each mode of each notification sink.

18. The method of claim 1, further initially comprising receiving via a notification manager the number of notifications from a number of notification sources.

19. A computer-implemented method comprising:
for each of a number of notifications, performing a decision-theoretic analysis as to the notification over a number of modes of each of a number of notification sinks: and,
conveying at least one of the number of notifications via at least one of the modes to at least one of the sinks based on the decision-theoretic analysis performed.

20. The method of claim 19, wherein performing the decision-theoretic analysis as to the notification over the number of modes of each of the number of sinks results in a value for the notification as to each mode of each notification sink.

21. The method of claim 20, wherein conveying the at least one of the number of notifications via the at least one of the modes of the at least one of the sinks comprises conveying each notification having value for any of the modes of any of the notification sinks greater than a predetermined conveyance threshold via the mode of the notification sink for which the notification has a highest value.

22. The method of claim 19, wherein the decision-theoretic analysis comprises determining an expected value of information contained within the notification.

23. The method of claim 22, wherein performing the decision-theoretic analysis further comprises determining an expected cost of disruption as to each mode of each notification sink.

24. The method of claim 22, wherein performing the decision-theoretic analysis further comprises determining an expected value of a user independently learning the information contained within the notification without having the notification conveyed to the user.

25. The method of claim 22, wherein performing the decision-theoretic analysis further comprises determining an actual cost of conveying the notification via each mode of each notification sink.

26. A machine-readable medium having instructions stored thereon for execution by a processor to perform a method comprising:
determining an expected value of information contained within a notification;
determining an expected cost of disruption to convey the notification to each of a number of notification sinks;
determining a value for each of the number of notification sinks equal to the expected value of information contained within the notification minus the expected cost of disruption to convey the notification to the notification sink;
where the value for any of the number of notification sinks is greater that a predetermined conveyance threshold, conveying the notification to the notification sink having a highest value.

27. The medium of claim 26, further comprising determining an expected value of a user independently learning the information contained within the notification without having the notification conveyed to the user, and wherein determining the value for each of the number of notification sinks further comprises substituting the expected value of the user independently learning the information contained within the notification without having the notification conveyed to the user.

28. The medium of claim 27, further comprising determining an actual cost of conveying the notification to each notification sink, wherein determining the value for each of the number of notification sinks further comprises subtracting the actual cost of conveying the notification to the notification sink.

29. A machine-readable medium having instructions stored thereon for execution by a processor to perform a method comprising:
determining an expected value of information contained with a notification;
determining an expected cost of disruption to convey the notification via each of a number of modes of each of a number of notification sinks;
determining a value for each mode of each notification sink equal to the expected value of information contained within the notification minus the expected cost of disruption to convey the notification via the mode of the notification sink;
where in the value for any of the number of modes of any of the number of notification sinks is greater than a predetermined conveyance threshold, conveying the notification via the mode of the notification sink having a highest value.

30. The medium of claim 29, further comprising determining an expected value of a user independently learning the information contained within the notification without having the notification conveyed the user, and wherein determining the value for each mode of each notification sink further comprises subtracting the expected value of the user independently learning the information contained with the notification without having the notification conveyed to the user.

31. The medium of claim 30, further comprising determining an actual cost of conveying the notification via each mode of each notification sink, wherein determining the value for each mode of each notification sink further comprises subtraction the actual cost of conveying the notification via the mode of the notification sink.

32. A system that facilitates conveying notifications, comprising:
means for performing a decision-theoretic analysis as to a notification over a number of notification sinks; and,
means for conveying the notification to at least one of the number of notification sinks based on the decision-theoretic analyses performed.

33. A system that facilitates conveying notifications, comprising:
a component that receives a notification and performs a decision-theoretic analysis as to the notification over a number of notification sinks; and,
a conveying component that conveys the notification to at least one of the number of notification sinks based on the decision-theoretic analyses performed.

* * * * *